(12) United States Patent
Li et al.

(10) Patent No.: US 10,457,573 B2
(45) Date of Patent: Oct. 29, 2019

(54) METHOD AND APPARATUS FOR PROCESSING RADIOACTIVE WASTEWATER

(71) Applicant: Tsinghua University, Beijing (CN)

(72) Inventors: Junfeng Li, Beijing (CN); Jianlong Wang, Beijing (CN); Shuli Zhao, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 671 days.

(21) Appl. No.: 15/029,098

(22) PCT Filed: Jan. 7, 2015

(86) PCT No.: PCT/CN2015/070290
§ 371 (c)(1),
(2) Date: Apr. 13, 2016

(87) PCT Pub. No.: WO2015/103983
PCT Pub. Date: Jul. 16, 2015

(65) Prior Publication Data
US 2016/0251239 A1 Sep. 1, 2016

(30) Foreign Application Priority Data

Jan. 9, 2014 (CN) .......................... 2014 1 0010846

(51) Int. Cl.
*B01D 61/02* (2006.01)
*C02F 1/44* (2006.01)
(Continued)

(52) U.S. Cl.
CPC ............ *C02F 1/441* (2013.01); *B01D 61/022* (2013.01); *B01D 61/08* (2013.01); *B01D 61/58* (2013.01);
(Continued)

(58) Field of Classification Search
CPC .. C02F 1/441; C02F 1/42; C02F 1/444; C02F 1/4693; C02F 1/66; C02F 1/001;
(Continued)

(56) References Cited

FOREIGN PATENT DOCUMENTS

| CN | 1132108 | 10/1998 |
|----|---------|---------|
| CN | 2878362 | 3/2007  |

(Continued)

OTHER PUBLICATIONS

Third Office Action dated Jun. 20, 2016 issued for Chinese Application No. 201410010846.3.
(Continued)

*Primary Examiner* — Vishal V Vasisth
(74) *Attorney, Agent, or Firm* — K&L Gates LLP

(57) ABSTRACT

A method and an apparatus for processing radioactive wastewater are provided, wherein the radioactive wastewater is processed by using Disc Tube Reverse Osmosis (DTRO) membrane assembly, thereby achieving both the effects of high decontamination factors and high concentration multiples. In said method, the radioactive wastewater passes through the first-stage membrane assembly and the second-stage membrane assembly in sequence to obtain the second-stage clear water, and the first-stage concentrated water flowing out of the first-stage membrane assembly enters the third-stage membrane assembly to obtain concentrate.

13 Claims, 4 Drawing Sheets

(51) Int. Cl.
*C02F 9/00* (2006.01)
*G21F 9/06* (2006.01)
*B01D 61/08* (2006.01)
*B01D 63/08* (2006.01)
*C02F 11/00* (2006.01)
*B01D 61/58* (2006.01)
*C02F 1/00* (2006.01)
*C02F 1/42* (2006.01)
*C02F 1/469* (2006.01)
*C02F 1/66* (2006.01)
*C02F 101/00* (2006.01)
*B01D 61/14* (2006.01)

(52) U.S. Cl.
CPC ............. *B01D 63/084* (2013.01); *C02F 9/00* (2013.01); *C02F 11/008* (2013.01); *G21F 9/06* (2013.01); *B01D 61/14* (2013.01); *B01D 2311/04* (2013.01); *B01D 2311/06* (2013.01); *B01D 2311/18* (2013.01); *B01D 2311/24* (2013.01); *B01D 2311/25* (2013.01); *B01D 2311/2623* (2013.01); *B01D 2311/2649* (2013.01); *B01D 2311/2684* (2013.01); *B01D 2317/022* (2013.01); *B01D 2317/025* (2013.01); *B01D 2317/06* (2013.01); *C02F 1/001* (2013.01); *C02F 1/42* (2013.01); *C02F 1/444* (2013.01); *C02F 1/4693* (2013.01); *C02F 1/66* (2013.01); *C02F 2101/006* (2013.01); *C02F 2301/046* (2013.01)

(58) Field of Classification Search
CPC . C02F 9/00; C02F 11/008; G21F 9/06; B01D 61/022; B01D 61/08; B01D 61/58; B01D 63/084; B01D 2311/04; B01D 2311/2649; B01D 2311/18
USPC .......................................................... 210/639
See application file for complete search history.

(56) References Cited

FOREIGN PATENT DOCUMENTS

| CN | 101028958 | | 9/2007 |
|---|---|---|---|
| CN | 201965936 | | 9/2011 |
| CN | 202164181 | | 3/2012 |
| CN | 103745759 | | 4/2014 |
| CN | 103762004 | A * | 4/2014 |
| DE | 3634180 | A1 | 5/1987 |
| JP | U11978043200 | | 9/1951 |
| JP | S50157800 | | 12/1975 |
| JP | U1978043200 | | 4/1978 |
| JP | S5385299 | | 7/1978 |
| JP | A 1980084586 | | 6/1980 |
| JP | A 1986116695 | | 6/1986 |
| JP | S63 53499 | A | 3/1988 |
| JP | A 1990143198 | | 6/1990 |
| JP | H06201897 | | 7/1994 |
| JP | A 2007203144 | | 8/2007 |
| JP | 2008076054 | | 4/2008 |
| JP | 2013096701 | A | 5/2013 |
| WO | WO2013179939 | | 12/2013 |

OTHER PUBLICATIONS

Extended European Search Report dated Feb. 1, 2017 issued for European Application No. 15734813.7.
First Office Action dated Jan. 24, 2017 issued for Japanese Application No. 2016-549613.
Usepa at al. Site Technology Capsule. Rochem Separation Systems, Inc., Disc Tube Module Technology, Apr. 15, 1998.
C.S. Pawaskar et al., "Performance evaluation of reverse osmosis with disc tube module . . . ", Proceedings of the DAE-BRNS theme meeting . . . , Sep. 18, 2013.
A. G. Chmielewski et al., "Concentration of Low- and Medium-level Radioactive Wastes . . . ", Separation Science and Technology, vol. 36, No. 5-6, Jun. 30, 2001.
Office Action dated Oct. 3, 2017 issued for Japanese Application No. 2016-549613.
The International Search Report dated Apr. 13, 2015 issued for International PCT Application No. PCT/CN2015/070290.
Hou Li-An (Editor-in-Chief), Special Wastewater Treatment and Engineering Examples, Chemical Industry Press Publications Center of Environmental Science And Engineering, Beiji.
Office Action Issued in Priority Chinese Patent Application No. 201410010846.3 dated Sep. 6, 2016, and English Translation.
Office Action Issued in Priority Chinese Patent Application No. 201410010846.3 dated Feb. 15, 2016, and English Translation.
Search Report Issued in Priority Chinese Patent Application No. Application No. 201410010846.3, and English Translation.
Huang Wan-Bo, Study on reverse osmosis treatment of uranium-containing wastewater . . . The Proceedings of the 30th anniversary of Nuclear Chemical Engineering . . . , Nov. 10, 2010.
Zhao Juan, "Application of Reverse Osmosis Membrane for Liquid Radioactive Waste Processing", Technology Progress Report on China Nuclear Science & Technology, vol. 1, Nov. 2009.
Wang Jian-Long et al., "Research Advances in Radioactive Wastewater Treatment Using Membrane Processes", Acta Scientiae Circumstantiae, vol. 33, No. 10, Oct. 31, 2013.
Zuo Junfang et al., "Application of DTRO Technology in the Treatment of Landfill Leachate", Membrane Science and Technology, vol. 31, No. 2, Apr. 2011.
Pabby, Anil Kumar et al., "Membrane Techniques for Treatment in Nuclear Waste Processing: Global Experience", Membrane Technology, Nov. 2008.
Li Juan et al., "Application and Characteristics of Two-Stage DTRO . . . ", Hunan Research Center of Treatment . . . , Journal of Anhui Agri. Sci., 2011, 39 (35), 21926-21928.
Office Action dated Oct. 9, 2018 issued for Japanese Application No. 2016-549613.
Office Action dated Oct. 9, 2018 issued for Japanese Application No. 2016-549613 and an English translation (machine).

* cited by examiner

METHOD AND APPARATUS FOR PROCESSING RADIOACTIVE WASTEWATER

CROSS-REFERENCE TO A RELATED APPLICATION AND PRIORITY CLAIM

This application claims the benefit under 35 U.S.C. § 371 to International Application Number PCT/CN2015/070290 filed on 7 Jan. 2015 which claims the priority of Chinese Patent Application No. 201410010846.3 filed on 9 Jan. 2014 to which priority is also claimed by the present application. The entire disclosures of said applications are incorporated by reference herein for all purposes.

BACKGROUND

Radioactive wastewater produced in the field of nuclear industry has been processed by conventional methods including flocculating settling, sand filtration, diatomaceous earth filtration, ultrafiltration, selective ion exchange, reverse osmosis membrane treatment, evaporation, and electrodialysis.

Each of these methods has its own application scopes and technical characteristics. The current studies mainly focus on the study of decontamination efficiency of various treatments for radioactive wastewater under the condition of reactor core melting down, as well as on the selection of suitable techniques for processing radioactive wastewater according to processing flow and process characteristics.

One goal when processing technology of radioactive wastewater is to increase the decontamination factor of radioactive wastewater, so that the concentration of radionuclide in discharged water is as low as possible and the volume of the concentrate obtained after wastewater treatment and containing radionuclide (simply referred to as "radioactive concentrate") is as small as possible. Existing membrane systems for processing radioactive wastewater have relatively high decontamination factor, however, their very low concentration multiples (usually merely 5-10) limit their use. At the same time, conventional reverse osmosis treatment systems have strict requirements on water supply, which also significantly limits their uses. If some pretreatments such as diatomaceous earth filtration are applied, the amount of the resulting solid waste would be significantly increased.

SUMMARY

Some example embodiments of the present disclosure include a method for processing radioactive wastewater, wherein radioactive wastewater is treated by using Disc Tube Reverse Osmosis (DTRO) membrane assembly, wherein decontamination factor is at least 500, and concentration multiple is at least 25.

In an exemplary embodiment, the radioactive wastewater passes through a first-stage membrane assembly and a second-stage membrane assembly in sequence, obtaining second-stage clear water; and first-stage concentrated water flowing out of the first-stage membrane assembly enters a third-stage membrane assembly, obtaining a concentrate.

In one example method, both second-stage concentrated water flowing out of the second-stage membrane assembly and concentrated clear water flowing out of the third-stage membrane assembly can be recycled into the first-stage membrane assembly for retreatment. Optionally, the radioactive wastewater can be subjected to pretreatment of sand filtration, ultrafiltration or pH adjustment, before being fed into the membrane assembly. In some examples, if pH adjustment is applied, the radioactive wastewater can be adjusted to have a pH value of 6-8.

Optionally, the radioactive wastewater can preferably have a salt content of no more than 5 g/L before treatment.

Another example embodiment described in the present disclosure includes an apparatus useful for performing an example method for processing radioactive wastewater according to the present disclosure, comprising first-stage, second-stage and third-stage Disc Tube Reverse Osmosis membrane assemblies and a water supply pump for providing the radioactive wastewater, wherein a clear water outlet of the first-stage membrane assembly is connected with an inlet of the second-stage membrane assembly; and a concentrated water outlet of the first-stage membrane assembly is connected with an inlet of the third-stage membrane assembly.

Optionally, both an outlet for concentrated water of the second-stage membrane assembly and an outlet for clear water of the third-stage membrane assembly are connected with an inlet of the first-stage membrane assembly.

Optionally, the apparatus for processing radioactive wastewater further comprises first-stage, second-stage and third-stage high-pressure pumps and circulating pumps used for the first-stage, the second-stage and the third-stage Disc Tube Reverse Osmosis membrane assemblies, respectively.

DETAILED DESCRIPTION

Figure 1:
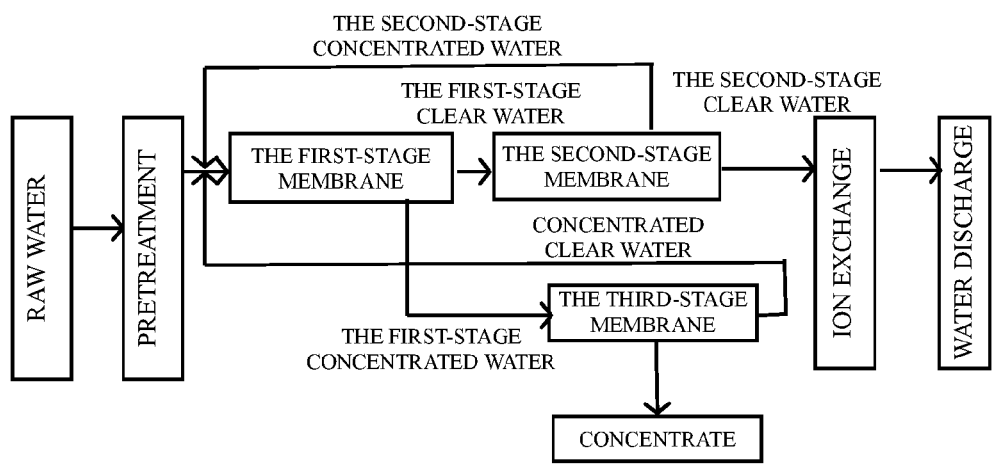
FIG. 1 is a flow chart of a method for processing radioactive waste in accordance with one example embodiment of the present disclosure.

The present disclosure generally relates to radioactive wastewater processing. An example method and an apparatus for processing radioactive wastewater by using Disc Tube Reverse Osmosis (DTRO) membrane technology is described.

The example methods and apparatus described in the present disclosure can simplify complicated pretreatment processes by selecting Disc Tube Reverse Osmosis membrane assembly having high stain resistance, and simultaneously achieve efficient treatment and high concentration multiples by optimizing combinations of the Disc Tube Reverse Osmosis membrane assemblies.

The treatment of radioactive wastewater is different from treatments of general wastewater such as coking wastewater, pharmaceutical wastewater, textile/printing and dyeing wastewater, petroleum/chemical wastewater, landfill leachate and so on for the reasons as follows: 1) the mass concentration of discharged radioactive nuclide ions is typically extremely low, which goes beyond the capability of conventional technology for processing wastewater; specifically, the radioactivity meeting the requirements for environmental emission is 10 Bq/L, for example, the mass concentrations of radioactive nuclides $^{90}$Sr and $^{137}$Cs are $2.0\times10^{-13}$ mg/L and $3.0\times10^{-13}$ mg/L, respectively; 2) The requirements for the amount of the resulting secondary radioactive waste are typically much higher than those of conventional wastewater treatment, and an important principle of processing radioactive waste is minimization of radioactive waste; 3) operability and maintainability of equipments under the radioactive conditions may present challenges.

Based on the above special requirements for treatment of radioactive wastewater, the present disclosure describes an example method and the apparatus for processing radioactive wastewater, wherein the mass concentrations of discharged radioactive nuclides are extremely low, while minimizing the amounts of the resulting radioactive waste.

In addition to the term "radioactivity", "decontamination factor" is also used herein to measure the mass concentrations of discharged radioactive nuclide ions. This factor is calculated by the formula of (radioactivity of raw water)/(radioactivity of clear water). As used herein, "concentration multiple" is used to measure the amount of the resulting radioactive waste, and can be calculated by the formula of (volume of raw water)/(volume of concentrate).

According to one example method for processing radioactive wastewater in the present disclosure, the radioactive wastewater, after being subjected to treatment by a DTRO membrane assembly, has a decontamination factor of at least 500 and a concentration multiple of at least 25, This result not only meets the emission standard 10 Bq/L of domestic sewage, but also can ensure that the amount of the resulting radioactive waste is as low as possible. This is also a key point where the present example method is significantly superior to methods for processing wastewater in the prior art. In the methods for processing wastewater in the prior art, either concentration multiple has never been considered, or complicated processes and equipments have to be used to simultaneously achieve the emission standard and the concentration multiple. Examples in the present disclosure utilize a DTRO membrane assembly to treat radioactive wastewater, and simultaneously achieves the emission standard of radioactive wastewater and minimize the amount of the resulting radioactive waste by applying simple and easy-to-operate process and apparatus.

In an exemplary embodiment of the method described in the present disclosure, three stages DTRO membrane assemblies are used to treat radioactive wastewater. FIG. 1 is a flow chart of an exemplary process for treatment of radioactive wastewater by using three stages DTRO membrane assemblies.

According to FIG. 1, the radioactive wastewater passes through the first-stage membrane assembly and the second-stage membrane assembly in sequence, obtaining the second-stage clear water; and the first-stage concentrated water flowing out of the first-stage membrane assembly enters the third-stage membrane assembly, obtaining the concentrate.

The second-stage concentrated water flowing out of the second-stage membrane assembly and the concentrated clear water flowing out of the third-stage membrane assembly can be recycled into the first-stage membrane assembly for retreatment.

Although raw water is subjected to pretreatment as shown in FIG. 1, it will be appreciated that such pretreatment is not an essential step. Since the membrane assembly used in the present disclosure is a DTRO membrane assembly, radioactive wastewater may be directly treated without pretreatment of raw water in any form, while still meeting the required emission standard. On the contrary, in many processes for treating radioactive wastewater in the prior art, wastewater needs to first be pretreated by a complicated ultrafiltration process, and only thereafter can the pretreated wastewater be fed to a reverse osmosis treatment. In the example method described in the present disclosure, omission of the pretreatment process can simplify the equipments for treatment, significantly reducing the cost for treatment.

In the case where pretreatment is conducted on raw water, operations such as sand filtration, ultrafiltration, or pH adjustment can be used, which can be easily determined by a skilled person in the art according to actual situation. If pH adjustment is conducted, the pH value of radioactive wastewater is preferably adjusted to 6-8. At the pH value in this range, the effects of reverse osmosis treatment of DTRO membrane assembly may be the best; longer service life of DTRO membrane assembly may also be ensured.

Also, the second-stage clear water may be subjected to ion exchange as shown in FIG. 1, but this step is optional according to actual situation. Radioactive water conventionally discharged from nuclear facilities generally has a radioactivity between 1000 Bq/L and 10000 Bq/L (β in total). After treatment through the two-stage DTRO membrane assemblies described in the present disclosure, the second-stage clear water usually has a radioactivity of lower than 10 Bq/L and meets the emission standard of domestic sewage. Even for non-conventionally leaked radioactive wastewater, such as radioactive wastewater from nuclear leakage in Fukushima, Japan in 2011, its radioactivity may be up to 50000 Bq/L, after being subjected to treatment through the two-stage DTRO membrane assembly described in the present disclosure, the second-stage clear water also has a radioactivity of near 10 Bq/L (for example, Example 1 below).

Nevertheless, if discharged sewage is required to have a value near the background value of natural water quality, the second-stage clear water flowing out of the second-stage membrane assembly can be fed for further fine treatment. In the example method described, if the second-stage clear water flowing out of the second-stage membrane assembly has a radioactivity of larger than 1 Bq/L, the second-stage clear water may be subjected to fine treatment. Fine treatment may be, e.g., ion exchange treatment or electrodialysis treatment. Even if the radioactive wastewater to be treated by the present method has a radioactivity of up to 50000 Bq/L, the obtained water after further fine treatment can still be near the natural water quality and may have a radioactivity of 0.5 Bq/L.

In a further example variation, in the case where the second-stage clear water obtained from the two-stage DTRO membrane assembly treatment is further subjected to ion exchange treatment, the used ion exchange resin can be used during a long period of time, because the second-stage clear water is already very clean. In general, the resin can be replaced after usage of 2-3 years, thereby significantly decreasing the amount of the resulting waste resin and reducing the cost for treatment in the whole process. The waste resin finally discharged can be subjected to solidification treatment together with the concentrate discharged from the third-stage membrane assembly.

In some DTRO membrane assemblies in the prior art, with the increased requirement of water quality, the number of the stages of the DTRO membrane assemblies is increased. However, in the present example method for processing radioactive wastewater, the number of the stages of membrane assemblies for processing clear water absolutely cannot be increased without limitation, merely for the purpose of pursuing water quality. This is because the increased membrane assemblies for processing clear water can also increase the amount of the concentrate, which would inevitably result in a reduction of the concentration multiple and thereby result in more waste that needs solicitation treatment. Additionally, if the number of the stages of membrane assemblies for processing concentrated water is increased, firstly, discharged water from membrane assemblies of the stages of the increased number has a high radioconcentration, and improper reflux would lead to increased radioactivity of discharged water; secondly, it is difficult to control the process so that the cost for treatment is increased. The number of the stages of membrane assemblies for processing clear water or concentrated water must be reasonably determined in consideration of both the decontamination factor and the concentration multiple. In an exemplary embodiment of the presently described method including no fine treatment step, the decontamination factor can be 500 to 5000, and the concentration multiple can be at least 25. Concentrated clear water flowing out of the third-stage membrane assembly can be recycled into the first-stage membrane assembly for retreatment without discharging the concentrate, and the concentrate is not discharged until the concentrate has a salt content of up to 125 g/L.

In one example method, three-stage DTRO membrane assemblies may be preferable, e.g., two-stage cascade membrane assemblies for processing clear water and one-stage membrane assembly for processing concentrated water, wherein concentrated water discharged from the third-stage membrane assembly can reach the maximum value of concentrated water in DTRO membrane assembly. Increase of the number of the stages for concentration will not further improve the concentration multiple.

In addition, prior art generally describes that a DTRO membrane assembly is particularly suitable for treatment of sewage with high concentration. However, the inventors have noticed that energy consumption of treatment can increase with increase of the salt content in raw water. Thus, the salt content of radioactive wastewater before treatment is preferably adjusted to no more than 5 g/L.

Figure 2A:
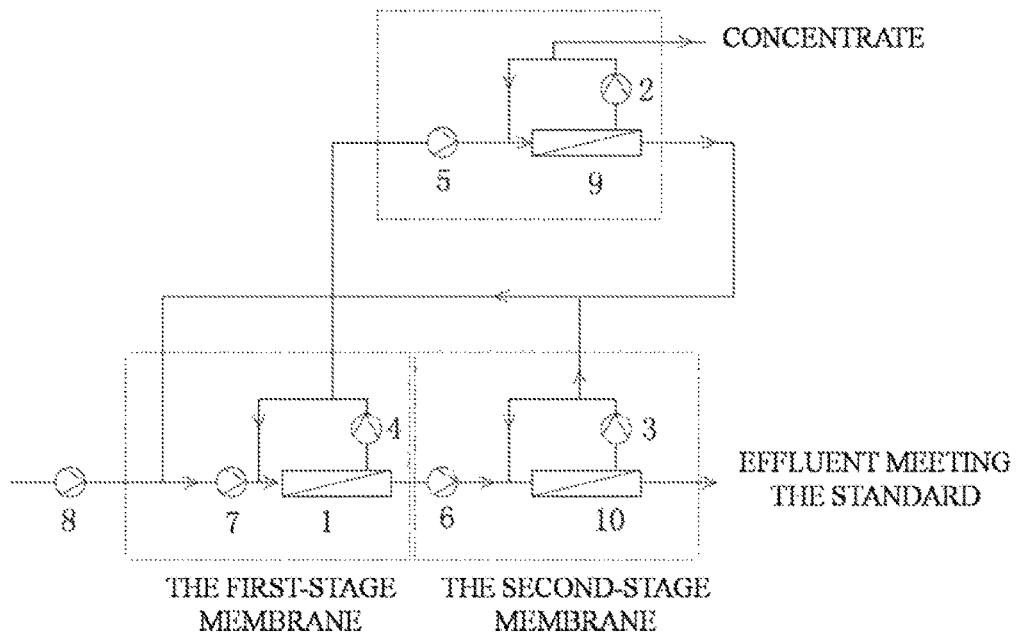
FIG. 2A and FIG. 2B are a schematic structure diagram and a physical diagram, respectively, of an apparatus for processing radioactive waste in accordance with one example embodiment of the present disclosure.
Figure 2B:
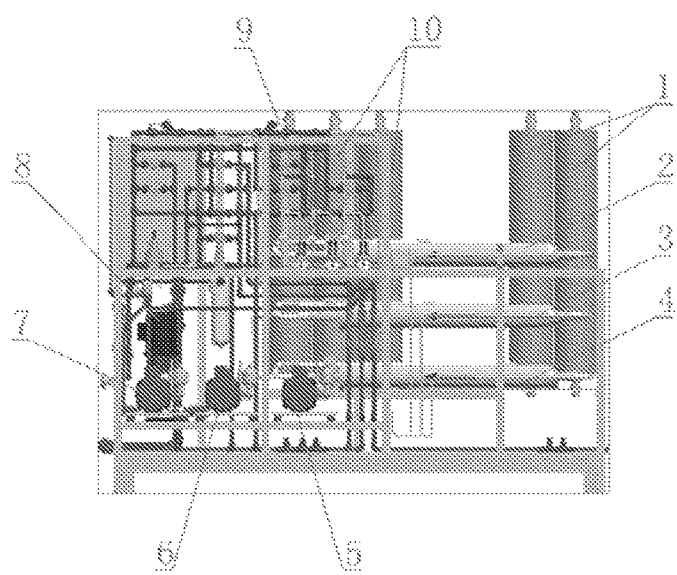

The present disclosure also provides an example apparatus for processing radioactive wastewater, e.g., for use with the example method. FIG. 2A and FIG. 2B are a schematic structure diagram and a physical diagram, respectively, of an apparatus for processing radioactive waste in accordance with one example embodiment of the present disclosure. In FIG. 2A and FIG. 2B, the apparatus for processing radioactive wastewater includes a first-stage Disc Tube Reverse Osmosis membrane assembly 1, a second-stage Disc Tube Reverse Osmosis membrane assembly 10 and a third-stage Disc Tube Reverse Osmosis membrane assembly 9, as well as a water supply pump 8 providing the radioactive wastewater, wherein an outlet of clear water of the first-stage membrane assembly 1 is connected with an inlet of the second-stage membrane assembly 10, and an outlet of concentrated water of the first-stage membrane assembly 1 is connected with an inlet of the third-stage membrane assembly 9; both an outlet of concentrated water of the second-stage membrane assembly 10 and an outlet of clear water of the third-stage membrane assembly 9 are connected with an inlet of the first-stage membrane assembly 1. The figures also show the first-stage high-pressure pump 7 and circulating pump 4, the second-stage high-pressure pump 6 and circulating pump 3, as well as the third-stage high-pressure pump 5 and circulating pump 2 for the first-stage, the second-stage and the third-stage Disc Tube Reverse Osmosis membrane assemblies, respectively.

Disc Tube Reverse Osmosis (DTRO) membrane assembly used in the present method has mainly been used for processing landfill leachate. As described above, due to special requirements for treatment of radioactive wastewater, radioactive wastewater cannot be practically treated by simply and directly using the methods and the apparatuses for processing other forms of wastewater through DTRO membrane assemblies described in the prior art.

Figure 3A:
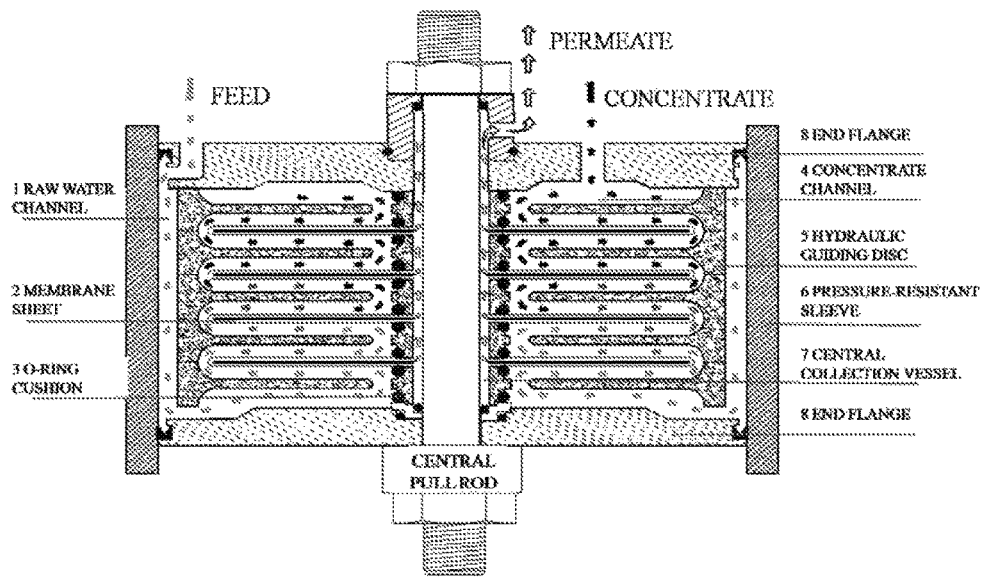
FIG. 3A and FIG. 3B are a schematic diagram of flow channels of an example Disc Tube Reverse Osmosis membrane assembly of the present disclosure and a physical diagram of the membrane assembly, respectively.
Figure 3B:
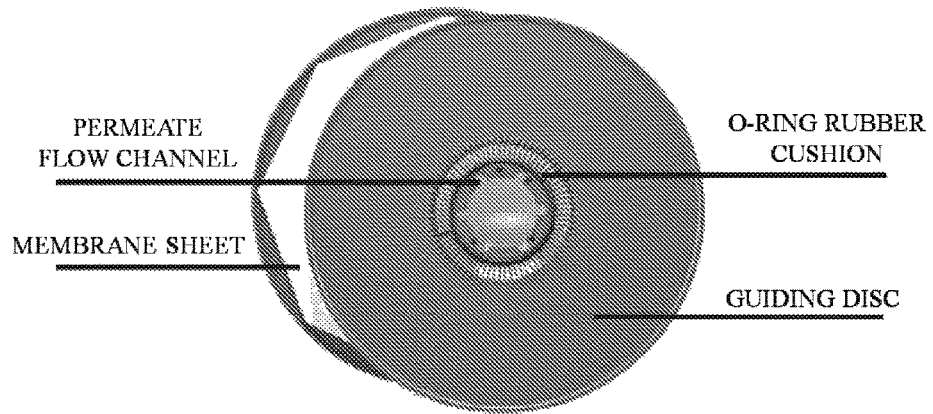

FIG. 3A and FIG. 3B illustrate a schematic flow channel (working principle) diagram of an example Disc Tube Reverse Osmosis membrane assembly used in the present disclosure and a physical diagram thereof. As can be seen, Disc Tube Reverse Osmosis membrane assembly may include a membrane sheet 2, hydraulic guiding disc 5, central pull rod, pressure-resistant sleeve 6, two end flanges 8, various seals and joining bolts, and so on. The membrane sheets and the guiding disc are stacked together and fixed with the central pull rod and the end flanges, and then they are placed into the pressure-resistant sleeve to form a Disc Tube Reverse Osmosis membrane assembly.

As shown in FIG. 3A, feed liquid passes through the gap between a stack of membrane sheets 2 and pressure-resistant sleeve 6, and enters guiding disc 5 at the bottom via raw water channel 1. The liquid to be treated quickly passes through membrane sheet 2 at the shortest distance, then reverses at 180° to the other face of the membrane sheet, and then flows therefrom into the next membrane sheet, thereby forming tangential stream filtration on the surfaces of membrane sheets, which is from a periphery of the guiding disc to a center of the disc, then back to the periphery, and then back to the center. The concentrate finally flows out of the flange 8 at the side of feed liquid. While feed liquid passes through membrane sheets, permeate is continuously discharged via central collection vessel 7. The concentrate and the permeate are separated by O-ring cushion 3 mounted on the guiding discs.

The water supply pump, high-pressure pumps and circulating pumps used for DTRO membrane assembly may be various pumps commonly-used in the art, such as piston pumps, centrifugal pumps and the like. However, in an example of the present disclosure, the high-pressure pumps may need to meet the requirements of high lift and low capacity, while in contrast, the circulating pumps need to meet the requirements of low lift and high capacity.

The present example apparatus for processing radioactive wastewater may operate as follows: firstly, initiating raw water supply pump; completely opening the outlet valve for concentrated water of the first-stage membrane assembly, then initiating the first-stage high-pressure pump and circulating pump (frequency conversion control), modulating the pressure between 2.5 and 7 MPa (a specific pressure may be determined depending on a concentration of radioactive raw water); completely opening the outlet valve for concentrated water of the second-stage membrane assembly, initiating the second-stage high-pressure pump and circulating pump (frequency conversion control), modulating the pressure between 2.5 and 7 MPa (a specific pressure may be determined depending on a concentration of radioactive raw water); finally, completely opening the outlet valve for concentrated water of the third-stage membrane assembly, initiating the third-stage high-pressure pump and circulating pump (frequency conversion control), modulating the pressure between 2.5 and 7 MPa (a specific pressure may be determined depending on a concentration of radioactive raw water).

The following examples further illustrate example embodiments of the present invention. The examples are not intended to limit the scope of the present invention at all.

The equipments used in examples are as follows:

| Name | Particulars |
| --- | --- |
| The first-stage, the second-stage and the third-stage DTRO membrane assemblies | DTG139ABS39, 6.3 m² |
| The first-stage, the second-stage circulating pumps | BM3A-12NE 0.75 KW/400/50/3 |
| The third-stage circulating pump | BM3A-9NE 0.75 KW/400/50/3 |
| The first-stage, the second-stage high-pressure pumps | 11.0 L/M@1450 RPM |
| The third-stage high-pressure pump | 1.6 L/M@1450 RPM |
| Water supply pump | GRUNDFOS CRN2-90 PUMP, 1 m³/h, lift 33 m |
| Ion exchange resin | Amberlite IRN77 cation resin and IRN78 anion resin commercially available from Rohm&Haas Company, with the ratio of anion and cation resins of 2:1, resin bed volume of 200 L |
| Total β Radioactivity meter | LSC-LB7 ultra low background liquid scintillation spectrometer |

Example 1

Raw water supply pump was initiated. 10 tons of wastewater having a salt content of 5 g/L and a total β radioactivity of 50000 Bq/L (the possible maximum concentration of radioactive wastewater in nuclear station and nuclear facilities) was fed into the apparatus shown in FIG. 2B for treatment.

The outlet valve for concentrated water of the first-stage membrane assembly was completely opened. The first-stage high-pressure pump (frequency conversion control, at 50 Hz) was initiated, and 3 minutes later, the first-stage circulating pump was initiated. The outlet valve for concentrated water of the first-stage membrane assembly was modulated so that the pressure at the outlet of the first-stage high-pressure pump was up to 5.5 MPa. The outlet valve for concentrated water of the second-stage membrane assembly was completely opened. The second-stage high-pressure pump was initiated, and 3 minutes later, the second-stage circulating pump was initiated (frequency conversion control, at 50 Hz). The outlet valve for concentrated water of the second-stage membrane assembly was modulated so that the pressure at the outlet of the second-stage high-pressure pump was up to 3.5 MPa.

The outlet valve for concentrated water of the third-stage membrane assembly was completely opened. The third-stage high-pressure pump was initiated, and 3 minutes later, the third-stage circulating pump was initiated (frequency conversion control, at 30 Hz). The outlet valve for concentrated water of the third-stage membrane assembly was modulated so that the pressure at the outlet of the third-stage high-pressure pump was up to 7 MPa.

After treatment, the clear water discharged from the first-stage membrane assembly had a total β radioactivity of 500 Bq/L; the clear water discharged from the second-stage membrane assembly had a total β radioactivity of 10 Bq/L; the decontamination factor of the two-stage membrane system was 5000; the concentrate to be cement-solidified had a volume of 0.4 cubic meters (salt content of 125 g/L). Thus, the radioactive wastewater had a concentration multiple of 25 in the whole process.

If the clear water flowing out of the second-stage membrane assembly was fed into an ion exchanger for further treatment, the total volume of the resulting clear water was 9.6 tons and the final clear water had a total β radioactivity of 0.5 Bq/L. Thus, the decontamination factor was 100000 in the whole process.

In view that the ratio of increased volume for cement solidification is generally 3, the volume of waste to be solidified is 1.2 cubic meters. If the cost for solidification is calculated in 0.1 million CNY per cubic meter, the cost of treatment after concentration of wastewater is 0.12 million CNY.

Example 2

10 tons of wastewater having a salt content of 5 g/L and a total β radioactivity of 10000 Bq/L was treated by the apparatus under the operation conditions as used in Example 1.

After treatment, the clear water discharged from the first-stage membrane assembly had a total β radioactivity of 100 Bq/L; the clear water discharged from the second-stage membrane assembly had a total β radioactivity of 2 Bq/L; the decontamination factor of the two-stage membrane system was 5000; the concentrate to be cement-solidified had a volume of 0.4 cubic meters (salt content of 125 g/L). Thus, the radioactive wastewater had a concentration multiple of 25 in the whole process.

If the clear water flowing out of the second-stage membrane assembly was fed into an ion exchanger for further treatment, the total volume of clear water was 9.6 tons and the final clear water had a total β radioactivity of 0.1 Bq/L. Thus, the decontamination factor was 100000 in the whole process.

In view that the ratio of increased volume for cement solidification is generally 3, the volume of waste to be solidified is 1.2 cubic meters. If the cost for solidification is calculated in 0.1 million CNY per cubic meter, the cost of treatment after concentration of wastewater is 0.12 million CNY.

Example 3

10 tons of wastewater having a salt content of 5 g/L and a total β radioactivity of 5000 Bq/L was treated by the apparatus under the operation conditions as used in Example 1.

After treatment, the clear water discharged from the first-stage membrane assembly had a total β radioactivity of 50 Bq/L; the clear water discharged from the second-stage membrane assembly had a total β radioactivity of 1 Bq/L the decontamination factor of the two-stage membrane system was 5000; the concentrate to be cement-solidified had a volume of 0.4 cubic meters (salt content of 125 g/L). Thus, the radioactive wastewater had a concentration multiple of 25 in the whole process.

If the clear water flowing out of the second-stage membrane assembly was fed into an ion exchanger for further treatment, the total volume of clear water was 9.6 tons and the final clear water had a total β radioactivity of 0.05 Bq/L. Thus, the decontamination factor was 100000 in the whole process.

In view that the ratio of increased volume for cement solidification is generally 3, the volume of waste to be solidified is 1.2 cubic meters. If the cost for solidification is calculated in 0.1 million CNY per cubic meter, the cost of treatment after concentration of wastewater is 0.12 million CNY.

Example 4

10 tons of wastewater having a salt content of 5 g/L and a total β radioactivity of 1000 Bq/L was treated by the apparatus under the operation conditions as used in Example 1.

After treatment, the clear water discharged from the first-stage membrane assembly had a total β radioactivity of 10 Bq/L: the clear water discharged from the second-stage membrane assembly had a total β radioactivity of 0.2 Bq/L; the decontamination factor of the two-stage membrane system was 5000; the concentrate to be cement-solidified had a volume of 0.4 cubic meters (salt content of 125 g/L). Thus, the radioactive wastewater had a concentration multiple of 25 in the whole process.

In view that the ratio of increased volume for cement solidification is generally 3, the volume of waste to be solidified is 1.2 cubic meters. If the cost for solidification is calculated in 0.1 million CNY per cubic meter, the cost of treatment after concentration of wastewater is 0.12 million CNY.

Example 5

Raw water supply pump was initiated. 10 tons of wastewater having a salt content of 1 g/L and a total β radioactivity of 10000 Bq/L was fed into the apparatus shown in FIG. 2B.

The outlet valve for concentrated water of the first-stage membrane assembly was completely opened. The first-stage high-pressure pump (frequency conversion control, at 45 Hz) was initiated, and 3 minutes later, the first-stage circulating pump was initiated. The outlet valve for concentrated water of the first-stage membrane assembly was modulated so that the pressure at the outlet of the first-stage high-pressure pump was up to 2.2 MPa. The outlet valve for concentrated water of the second-stage membrane assembly was completely opened. The second-stage high-pressure pump was initiated, and 3 minutes later, the second-stage circulating pump was initiated (frequency conversion control, at 45 Hz). The outlet valve for concentrated water of the second-stage membrane assembly was modulated so that the pressure at the outlet of the second-stage high-pressure pump was up to 2.2 MPa.

The outlet valve for concentrated water of the third-stage membrane assembly was completely opened. The third-stage high-pressure pump was initiated, and 3 minutes later, the third-stage circulating pump was initiated (frequency conversion control, at 30 Hz). The outlet valve for concentrated water of the third-stage membrane assembly was modulated so that the pressure at the outlet of the third-stage high-pressure pump was up to 5.5 MPa.

After treatment, the clear water discharged from the first-stage membrane assembly had a total β radioactivity of 200 Bq/L; the clear water discharged from the second-stage membrane assembly had a total β radioactivity of 4 Bq/L; the decontamination factor of the two-stage membrane system was 2500; the concentrate to be cement-solidified had a volume of 0.2 cubic meters (salt content of 50 g/L). Thus, the radioactive wastewater had a concentration multiple of 50 in the whole process.

If the clear water flowing out of the second-stage membrane assembly was fed into an ion exchanger for further treatment, the total volume of clear water was 9.8 tons and the final clear water had a total β radioactivity of 0.2 Bq/L. Thus, the decontamination factor was 50000 in the whole process.

In view that the ratio of increased volume for cement solidification is generally 3, the volume of waste to be solidified is 0.6 cubic meters. If the cost for solidification is calculated in 0.1 million CNY per cubic meter, the cost of treatment after concentration of wastewater is 0.06 million CNY.

Example 6

10 tons of wastewater having a salt content of 1 g/L and a total β radioactivity of 5000 Bq/L was treated by the apparatus under the operation conditions as used in Example 5.

After treatment, the clear water discharged from the first-stage membrane assembly had a total β radioactivity of 100 Bq/L; the clear water discharged from the second-stage membrane assembly had a total β radioactivity of 2 Bq/L; the decontamination factor of the two-stage membrane system was 2500; the concentrate to be cement-solidified had a volume of 0.2 cubic meters (salt content of 50 g/L). Thus, the radioactive wastewater had a concentration multiple of 50 in the whole process.

If the clear water flowing out of the second-stage membrane assembly was fed into an ion exchanger for further treatment, the total volume of clear water was 9.8 tons and the final clear water had a total β radioactivity of 0.1 Bq/L. Thus, the decontamination factor was 50000 in the whole process.

In view that the ratio of increased volume for cement solidification is generally 3, the volume of waste to be solidified is 0.6 cubic meters. If the cost for solidification is calculated in 0.1 million CNY per cubic meter, the cost of treatment after concentration of wastewater is 0.06 million CNY.

Example 7

10 tons of wastewater having a salt content of 1 g/L and a total β radioactivity of 1000 Bq/L was treated by the apparatus under the operation conditions as used in Example 5.

After treatment, the clear water discharged from the first-stage membrane assembly had a total β radioactivity of 20 Bq/L; the clear water discharged from the second-stage membrane assembly had a total β radioactivity of 0.4 Bq/L; the decontamination factor of the two-stage membrane system was 2500; the concentrate to be cement-solidified had a volume of 0.2 cubic meters (salt content of 50 g/L). Thus, the radioactive wastewater had a concentration multiple of 50 in the whole process.

In view that the ratio of increased volume for cement solidification is generally 3, the volume of waste to be solidified is 0.6 cubic meters. If the cost for solidification is calculated in 0.1 million CNY per cubic meter, the cost of treatment after concentration of wastewater is 0.06 million CNY.

Example 8

Raw water supply pump was initiated. 10 tons of wastewater having a salt content of 0.1 g/L and a total β radioactivity of 5000 Bq/L was fed into the apparatus shown in FIG. 2B.

The outlet valve for concentrated water of the first-stage membrane assembly was completely opened. The first-stage high-pressure pump (frequency conversion control, at 40 Hz) was initiated, and 3 minutes later, the first-stage circulating pump was initiated. The outlet valve for concentrated water of the first-stage membrane assembly was modulated so that the pressure at the outlet of the first-stage high-pressure pump was up to 2.2 MPa. The outlet valve for concentrated water of the second-stage membrane assembly was completely opened. The second-stage high-pressure pump was initiated, and 3 minutes later, the second-stage circulating pump was initiated (frequency conversion control, at 40 Hz). The outlet valve for concentrated water of the second-stage membrane assembly was modulated so that the pressure at the outlet of the second-stage high-pressure pump was up to 2.2 MPa. The outlet valve for concentrated water of the third-stage membrane assembly was completely opened. The third-stage high-pressure pump was initiated, and 3 minutes later, the third-stage circulating pump was initiated (frequency conversion control, at 30 Hz). The outlet valve for concentrated water of the third-stage membrane assembly was modulated so that the pressure at the outlet of the third-stage high-pressure pump was up to 3.5 MPa.

After treatment, the clear water discharged from the first-stage membrane assembly had a total β radioactivity of 125 Bq/L; the clear water discharged from the second-stage membrane assembly had a total β radioactivity of 10 Bq/L; the decontamination factor of the two-stage membrane system was 500; the concentrate to be cement-solidified had a volume of 0.1 cubic meters (salt content of 10 g/L). Thus, the radioactive wastewater had a concentration multiple of 100 in the whole process.

If the clear water flowing out of the second-stage membrane assembly was fed into an ion exchanger for further treatment, the total volume of clear water was 9.9 tons and the final clear water had a total β radioactivity of 0.5 Bq/L. Thus, the decontamination factor was 10000 in the whole process.

In view that the ratio of increased volume for cement solidification is generally 3, the volume of waste to be solidified is 0.3 cubic meters. If the cost for solidification is calculated in 0.1 million CNY per cubic meter, the cost of treatment after concentration of wastewater is 0.03 million CNY.

Example 9

10 tons of wastewater having a salt content of 0.1 g/L and a total β radioactivity of 1000 Bq/L was treated by the apparatus under the operation conditions as used in Example 8.

After treatment, the clear water discharged from the first-stage membrane assembly had a total β radioactivity of 25 Bq/L; the clear water discharged from the second-stage membrane assembly had a total β radioactivity of 2 Bq/L; the decontamination factor of the two-stage membrane system was 500; the concentrate to be cement-solidified had a volume of 0.1 cubic meters (salt content of 10 g/L). Thus, the radioactive wastewater had a concentration multiple of 100 in the whole process.

If the clear water flowing out of the second-stage membrane assembly was fed into an ion exchanger for further treatment, the total volume of clear water was 9.9 tons and the final clear water had a total β radioactivity of 0.1 Bq/L. Thus, the decontamination factor was 10000 in the whole process.

In view that the ratio of increased volume for cement solidification is generally 3, the volume of waste to be solidified is 0.3 cubic meters. If the cost for solidification is calculated in 0.1 million CNY per cubic meter, the cost of treatment after concentration of wastewater is 0.03 million CNY.

Comparative Example 1

10 tons of radioactive wastewater having a salt content of 1 g/L and a total β radioactivity of 10000 Bq/L was treated in the same way as in Example 5, except that the concentrated water flowing out of the first-stage DTRO membrane assembly was not fed into the third-stage DTRO membrane assembly for further treatment, but was directly used as concentrate.

After treatment, the total β radioactivity of discharged water in each stage was as follows: 200 Bq/L, for the first-stage membrane assembly, 4 Bq/L for the second-stage membrane assembly, and 0.2 Bq/L for an on exchanger. Thus, the decontamination factor of the first-stage membrane assembly was 50; the decontamination factor of the second-stage membrane assembly was 50; the decontamination factor was 50000 in the whole process.

However, the total volume of clear water discharged after treatment was 9 tons, the volume of concentrate to be cement-solidified was 1 cubic meter, and thus the concentration multiple was 10.

In view that the ratio of increased volume for cement solidification is generally 3, the volume of waste to be solidified is 3 cubic meters. If the cost for solidification is calculated in 0.1 million CNY per cubic meter the cost of treatment after concentration of wastewater is 0.3 million CNY. Obviously, the cost of treatment is 5 times as much as that in Example 5.

Comparative Example 2

Figure 4:
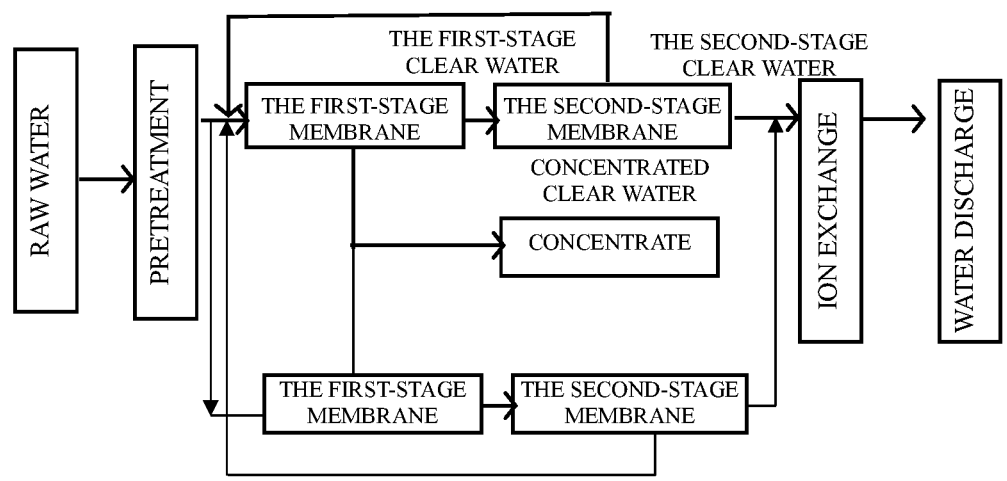
FIG. 4 is a flow chart of the process of Comparative Example 2.

According to the flow chart as shown in FIG. 4, 10 tons of radioactive wastewater having a salt content of 1 g/L and a total β radioactivity of 10000 Bq/L was treated, wherein each two of four DTRO membrane assemblies were paired in series, forming two groups of the first-stage and the second-stage membrane assemblies. The two groups of membrane assemblies were in parallel to each other. The concentrated water flowing out of the first-stage membrane assembly in each group of membrane assemblies was not fed into the third-stage DTRO membrane assembly for further treatment, but was directly used as concentrate.

After treatment, the total β radioactivity of discharged water in each stage was as follows: 200 Bq/L, for the first-stage membrane assembly, 4 Bq/L for the second-stage membrane assembly, and 0.2 Bq/L for ion exchanger. Thus, the decontamination factor of the first-stage membrane assembly was 50; the decontamination factor of the second-stage membrane assembly was 50; the decontamination factor was 50000 in the whole process.

However, the total volume of clear water discharged after treatment was 9 tons, the volume of the concentrate to be cement-solidified was 1 cubic meter, and thus the concentration multiple was 10.

In view that the ratio of increased volume for cement solidification is generally 3, the volume of waste to be solidified is 3 cubic meters. If the cost for solidification is calculated in 0.1 million CNY per cubic meter, the cost of treatment after concentration of wastewater is 0.3 million CNY. Obviously, the cost of treatment is 5 times as much as that in Example 5.

The invention claimed is:

1. A method for processing radioactive wastewater, comprising:
    treating the radioactive wastewater using a Disc Tube Reverse Osmosis membrane assembly to produce clear water and a concentrate,
    wherein said treating step includes:
        passing the radioactive wastewater through a first-stage membrane assembly of the Disk Tube Reverse osmosis membrane assembly and a second-stage membrane assembly of the Disk Tube Reverse osmosis membrane assembly in sequence;
        obtaining second-stage clear water from the second stage membrane assembly;
        entering first-stage concentrated water flowing out of the first-stage membrane assembly into a third-stage membrane assembly of the Disk Tube Reverse osmosis membrane assembly; and
        obtaining the concentrate from the third stage membrane assembly;
    wherein the method has a decontamination factor of at least 500 and a concentration multiple of at least 25.

2. The method according to claim 1, wherein said treating step further includes recycling second-stage concentrated water flowing out of the second-stage membrane assembly into the first-stage membrane assembly.

3. The method according to claim 2, wherein said treating step further includes recycling concentrated clear water flowing out of the third-stage membrane assembly into the first-stage membrane assembly.

4. The method according to claim 1, wherein if the second-stage clear water flowing out of the second-stage membrane assembly has a radioactivity of larger than 1 Bq/L, then the second-stage clear water is subjected to fine treatment.

5. The method according to claim 2, wherein the concentrated clear water flowing out of the third-stage membrane assembly is recycled into the first membrane assembly for retreatment without discharging the concentrate, and the concentrate is not discharged until the concentrate has a salt content of up to 125 g/L.

6. The method according to claim 1, wherein the radioactive wastewater is subject to pretreatment of sand filtration, ultrafiltration or pH adjustment, before being fed into the Disc Tube Reverse Osmosis membrane assembly.

7. The method according to claim 6, wherein the radioactive wastewater is adjusted to have a pH of 6-8, before being fed into the membrane assembly.

8. The method according to claim 1, wherein the radioactive wastewater has a salt content of no more than 5 g/L before treatment.

9. An apparatus for processing radioactive wastewater, comprising:
    first-stage, second-stage and third-stage Disc Tube Reverse Osmosis membrane assemblies; and
    a water supply pump for providing the radioactive wastewater,
    wherein an outlet of clear water of the first-stage membrane assembly is connected with an inlet of the second-stage membrane assembly; and an outlet of concentrated water of the first-stage membrane assembly is connected with an inlet of the third-stage membrane assembly.

10. The apparatus according to claim 9, wherein an outlet of concentrated water of the second-stage membrane assembly is connected with an inlet of the first-stage membrane assembly.

11. The apparatus according to claim 10, wherein an outlet of clear water of the third-stage membrane assembly is connected with an inlet of the first-stage membrane assembly.

12. The apparatus according to claim 9, wherein the apparatus further comprises first-stage, second-stage and third-stage high-pressure pumps and circulating pumps for the first-stage, the second-stage and the third-stage Disc Tube Reverse Osmosis membrane assemblies, respectively.

13. The apparatus according to claim 9, wherein the apparatus further comprises fine treatment apparatus useful for processing second-stage clear water.

* * * * *